W. A. AND G. W. DELAHEY.
TIRE INFLATOR.
APPLICATION FILED JAN. 21, 1920.

1,359,795.

Patented Nov. 23, 1920.

INVENTORS.
WALLACE A. DELAHEY
GEORGE W. DELAHEY.

BY Featherstonhaugh & Co
ATTYS.

UNITED STATES PATENT OFFICE.

WALLACE ATCHESON DELAHEY AND GEORGE WHITEFIELD DELAHEY, OF OTTAWA, ONTARIO, CANADA.

TIRE-INFLATOR.

1,359,795.   Specification of Letters Patent.   Patented Nov. 23, 1920.

Application filed January 21, 1920. Serial No. 352,941.

*To all whom it may concern:*

Be it known that we, WALLACE ATCHESON DELAHEY and GEORGE WHITEFIELD DELAHEY, subjects of the King of Great Britain, residents of the city of Ottawa, Province of Ontario, Dominion of Canada, have invented certain new and useful Improvements in Tire-Inflators, of which the following is a specification.

This invention relates to improvements in tire inflators, fire extinguishers, and the like, and the objects of the invention are to permit of a gas being stored under pressure and being utilized when desired.

When this invention is constructed as a tire inflator, then air may be stored under pressure in a container which may be attached to a tire, in such a manner that the air pressure will be transferred from the container to the tire.

When the invention is adapted for use as a fire extinguisher then the container is filled with a gas, which will be a non-supporter of combustion, and the said gas may be liberated near a conflagration and so extinguish the fire.

For a further description of our invention, reference is made to the accompanying drawings in which.

Figure 2:
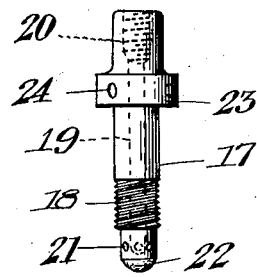
Fig. 2 is a front elevation of the valve which is fitted to the container.
Figure 1:
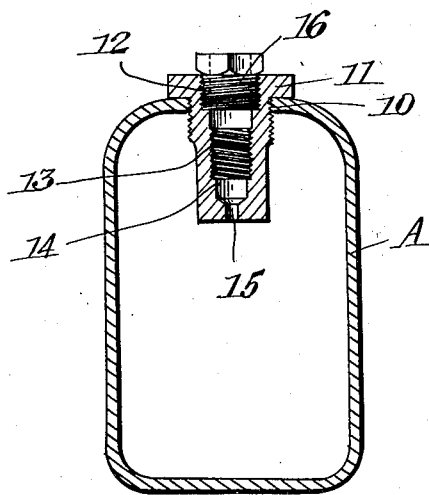
Figure 1 is a sectional elevation of a container.

Referring to the drawings, A represents a container of any suitable type, provided with an opening 10 on one end, in which the bushing 11 is threaded.

The inner periphery of this bushing is formed stepped being provided with an enlarged threaded bore 12, which communicates with a smaller threaded bore 13, which bore is again reduced at 14, and an outlet conduit 15 communicates with this stepepd bore.

A bushing 16 makes threaded engagement with the enlarged bore 12, and a valve 17 is formed with a stepped outer periphery, one portion 18 of which is threaded to engage with the threaded portion 13 of the bore.

This valve 17 has a central conduit 19 terminating in the upper end in an enlargement 20 which is threaded to accommodate the valve of a pneumatic tire, and the lower end of this conduit 19 communicates with a plurality of radially extending conduits 21.

The lower end of the stepped valve 17 is provided with a soft facing 22, which engages with a valve seating in the bushing 11 and seals the conduit 15, rendering the container A gas-tight.

The valve 17 is provided with a collar 23 having orifices 24 therein, adapted to be engaged by a spanner to tighten the valve in engagement with the bushing 11.

When this device is being assembled the bushing 16 is engaged with the valve 17 which is then inserted in the bushing 11, and the threaded portion 18 engages with the portion 13 of the bore.

Packing will be inserted between the bushing 16 and the stepped portion of the bore 12 and on the bushing 16 being tightened, it will press on the packing and provide a gas tight joint.

The valve when seated in position will have engaged the soft end 22 with the conduit 15, thereby making the container A gas-tight.

This soft end or seating 22 on the valve 17 may be formed of solder or like material. When the device is in use, the enlargement 20 is threaded on the valve of a pneumatic tire, whereupon the valve 17 is then loosened slightly, to permit of the gas in the container A passing through the conduits 21 into the conduit 19 and entering the inner tube of the tire on which the inflator has been attached.

The tire will then be inflated to the desired extent after which the valve of the tire may be tightened, and the container A removed.

When this device is used for storing a gas for extinguishing fires, then the container A is charged with a non-supporter of combustion, such as carbon dioxid, and when the valve 17 is loosened this gas will escape and be directed on the fire and so extinguish the same.

As many changes could be made in the above construction, and many apparently widely different embodiments of our invention, within the scope of the claims, constructed without departing from the spirit or scope thereof, it is intended that all matter contained in the accompanying specification and drawings shall be interpreted as illustrative and not in a limiting sense.

What we claim as our invention is:

A device of the class described, comprising a container having a bushing inserted therein provided with a stepped bore, a valve having a stepped outer periphery making threaded engagement with a portion of the bore and provided with a seating on the end of relatively soft material to provide an air tight joint, the said valve being formed with a conduit communicating with radial conduits, as and for the purpose specified.

In witness whereof we have hereunto set our hands.

WALLACE ATCHESON DELAHEY.
GEORGE WHITEFIELD DELAHEY.